(12) United States Patent
Malina

(10) Patent No.: US 11,514,938 B2
(45) Date of Patent: Nov. 29, 2022

(54) DATA STORAGE DEVICE REDUCING WAKE LATENCY FOR MAGNETIC TAPE

(71) Applicant: Western Digital Technologies, Inc., San Jose, CA (US)

(72) Inventor: James N. Malina, Irvine, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/178,344

(22) Filed: Feb. 18, 2021

(65) Prior Publication Data

US 2022/0059125 A1 Feb. 24, 2022

Related U.S. Application Data

(60) Provisional application No. 63/067,609, filed on Aug. 19, 2020.

(51) Int. Cl.
*G11B 5/54* (2006.01)
*G11B 5/008* (2006.01)

(52) U.S. Cl.
CPC .......... *G11B 5/54* (2013.01); *G11B 5/00813* (2013.01)

(58) Field of Classification Search
None
See application file for complete search history.

(56) References Cited

U.S. PATENT DOCUMENTS

| 4,052,742 A * | 10/1977 | Pastor et al. ....... G11B 15/1883 360/96.1 |
| 4,291,373 A * | 9/1981 | Mizote et al. ..... G01C 21/3629 360/72.2 |
| 5,870,265 A | 2/1999 | Boutaghou |
| 6,587,298 B1 | 7/2003 | Yamada |
| 7,940,496 B2 | 5/2011 | Vanderheyden |
| 2009/0103205 A1* | 4/2009 | Oishi ................. G11B 5/00813 360/77.12 |
| 2015/0356997 A1* | 12/2015 | Wang et al. ........... G11B 27/22 386/240 |

* cited by examiner

*Primary Examiner* — Craig A. Renner
(74) *Attorney, Agent, or Firm* — Patterson & Sheridan, LLP; Steven H. VerSteeg

(57) ABSTRACT

A data storage device is disclosed comprising at least one head configured to access a magnetic tape. The head is positioned at an idle location along a length of the magnetic tape when entering an idle mode, wherein the idle location reduces a wake latency associated with accessing the magnetic tape when exiting the idle mode.

22 Claims, 3 Drawing Sheets

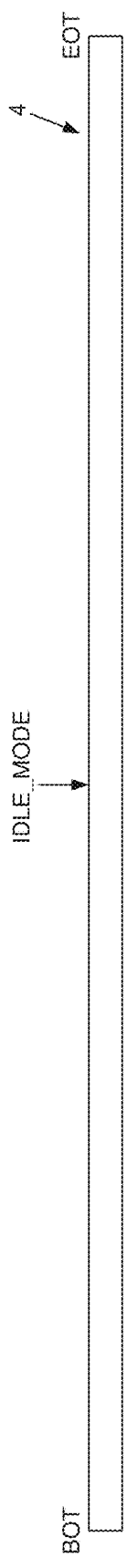
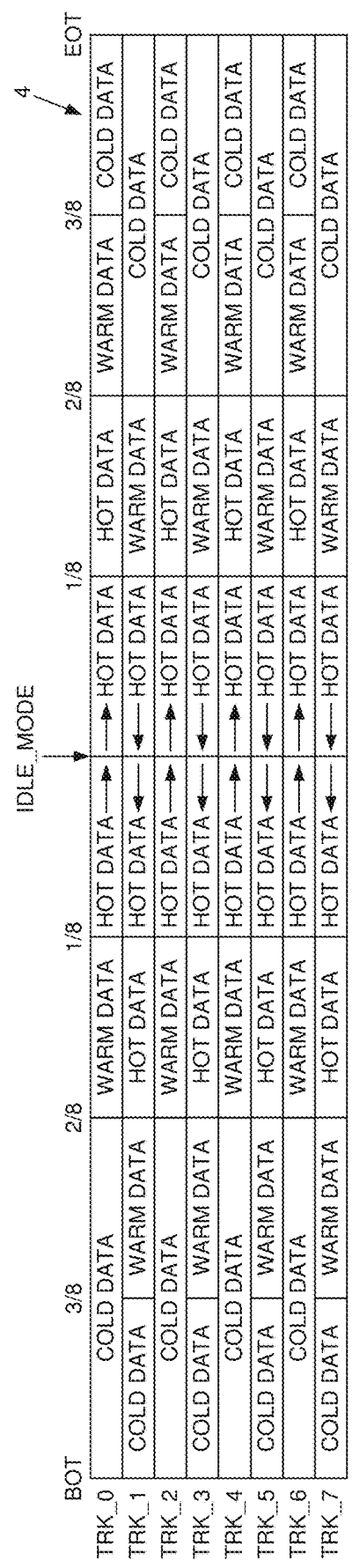
FIG. 2A
FIG. 2B
FIG. 2C

DATA STORAGE DEVICE REDUCING WAKE LATENCY FOR MAGNETIC TAPE

CROSS REFERENCE TO RELATED APPLICATIONS

This application claims priority to U.S. Provisional Patent Application Ser. No. 63/067,609, filed on Aug. 19, 2020, which is hereby incorporated by reference in its entirety.

BACKGROUND

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a lateral dimension across the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

BRIEF DESCRIPTION OF THE DRAWINGS

FIG. 2A shows an embodiment wherein the idle location is proximate a middle of the length of the magnetic tape.

FIG. 2B shows an embodiment wherein the idle location is proximate high access frequency data recorded on the magnetic tape.

FIG. 2C shows an embodiment wherein hot data, warm data, and cold data are written to the magnetic tape relative to the idle location in order to reduce the wake latency.

DETAILED DESCRIPTION

Figure 1A:
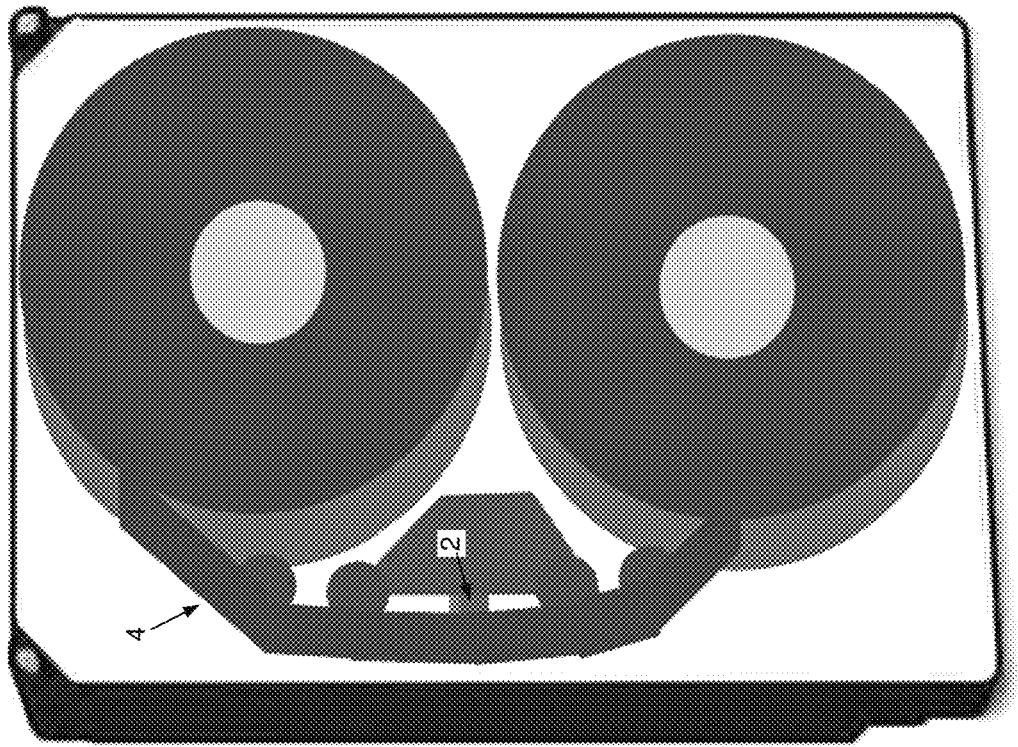
FIG. 1A shows a data storage device according to an embodiment comprising at least one head configured to access a magnetic tape.
Figure 1B:
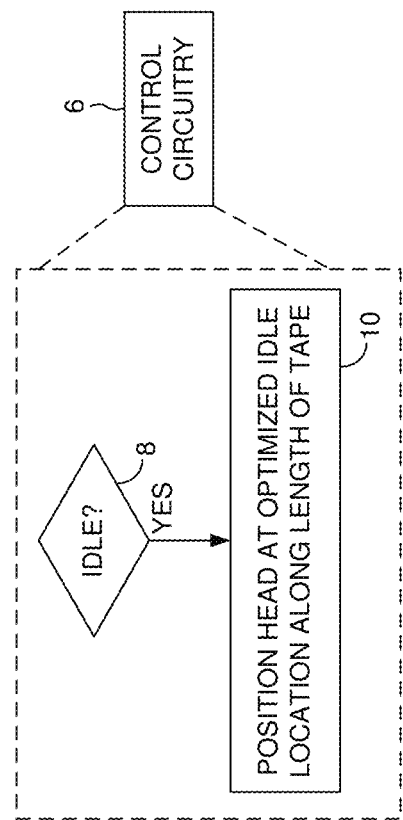
FIG. 1B is a flow diagram according to an embodiment wherein when entering an idle mode the head is positioned at an idle location along the length of the magnetic tape in order to reduce a wake latency associated with accessing the magnetic tape when exiting the idle mode.

FIGS. 1A and 1B show a data storage device according to an embodiment comprising at least one head 2 configured to access a magnetic tape 4. The data storage device further comprises control circuitry 6 configured to execute the flow diagram of FIG. 1B, wherein when entering an idle mode (block 8) the head is positioned at an idle location along the length of the magnetic tape (block 10) in order to reduce a wake latency associated with accessing the magnetic tape when exiting the idle mode.

Figure 1C:
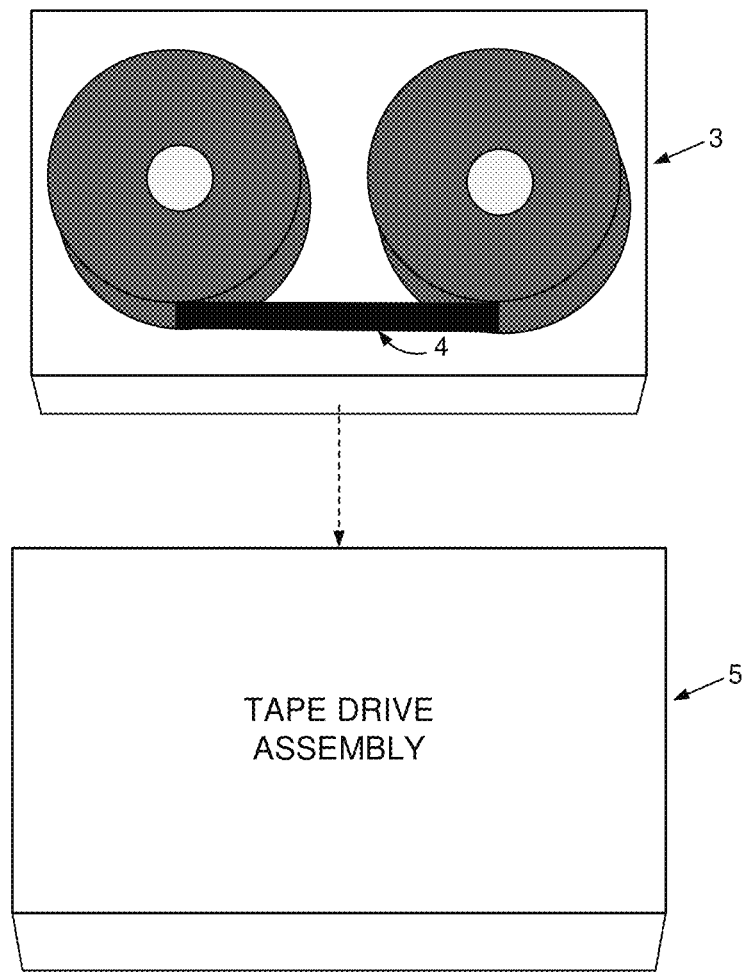
FIG. 1C shows a data storage device comprising a cartridge assembly comprising a magnetic tape, and a tape drive assembly configured to access the magnetic tape.

In the embodiment of FIG. 1A, the data storage device comprises an embedded magnetic tape 4 installed into a tape drive assembly which, in one embodiment, may be the same form factor as a conventional disk drive. In another embodiment shown in FIG. 1C, the magnetic tape 4 may be housed in a cartridge assembly 3 that is inserted into (and ejected from) a tape drive assembly 5 similar to a conventional tape drive manufactured under the Linear Tape-Open (LTO) standard. In one embodiment, the tape drive assembly 5 comprises the head 2 configured to access the magnetic tape 4, and the control circuitry 6 configured to execute the flow diagram of FIG. 1B.

FIG. 2A shows an embodiment wherein the idle location of the head when entering the idle mode is proximate a middle of the length of the magnetic tape 4. In one embodiment, the middle of the magnetic tape corresponds to the minimum average access latency required to scan the magnetic tape 4 to a target location when exiting the idle mode. That is when exiting the idle mode with the head positioned at the middle of the magnetic tape, the shortest scan length is zero and the longest scan length is half of the magnetic tape. Assuming that the magnetic tape is divided into accessible segments each having the same probability of being accessed when exiting the idle mode, then the average scan length to scan the tape to a target segment would be one-quarter length of the magnetic tape.

In one embodiment shown in FIG. 2B, high access frequency data (or hot data) may be stored at a particular location on the magnetic tape, wherein in the example of FIG. 2B the hot data is stored in the first quarter of the magnetic tape. In this embodiment, the idle location of the magnetic tape is configured to be in the middle of the hot data in order to reduce the access latency when exiting the idle mode since there is a higher probability that the hot data will be accessed first. In one embodiment, the control circuitry 6 within the data storage device is configured to track the hot data and the cold data so that the data can be initially written and/or migrated to the respective areas of the magnetic tape. For example, in one embodiment the control circuitry may maintain an access counter for each data file stored on the magnetic tape, wherein the access counter may be incremented for each write/read access of the file. When the access frequency (access counter divided by predetermined interval) exceeds a threshold the data file may be considered hot and migrated to the hot area of the magnetic tape. Conversely when the access frequency falls below a threshold the data file may be considered cold and migrated to the cold area of the magnetic tape. In another embodiment, the host of the data storage device may transmit a hot/cold identifier to the control circuitry 6 in order to designate each data file as a hot or cold file, wherein the control circuitry 6 may then store each file into a respective hot or cold area of the magnetic tape.

In one embodiment, the host of the data storage device may configure the idle location for the magnetic tape by transmitting the idle location to the control circuitry 6. In this embodiment, the host may also direct the control circuitry 6 to store hot and cold data files in a designated area of the magnetic tape. That is, the host may define the hot and cold areas of the magnetic tape and then direct the control circuitry 6 to store the data files in the appropriate areas since the host has a priori knowledge of whether a data file is hot or cold. Accordingly since the host is aware of the hot/cold areas of the magnetic tape, the host may also configure the idle location of the magnetic tape to be in the middle of the hot area as in FIG. 2B.

FIG. 2C shows an embodiment wherein high access frequency data (hot data) is written proximate the idle location of the magnetic tape, and low access frequency data (cold data) is written away from the idle location of the magnetic tape. In the example of FIG. 2C, a plurality of data tracks are defined laterally across the magnetic tape wherein each data track spans from the beginning of the tape (BOT) to the end of the tape (EOT). In the example of FIG. 2C, the even data tracks are written from the BOT to EOT (by scanning the tape from right to left) and the odd data tracks are written from the EOT to the BOT (by scanning the tape from the left to right). Also in this example, the idle location is defined at the middle of the magnetic tape so that the scan latency when exiting the idle mode falls within a predetermined range depending on the access frequency of the data. The access latency of the hot data in the example of FIG. 2C ranges from 0 to 2/8 the length of the magnetic tape, the access latency of warm data ranges from 2/8 to 3/8 the length of the magnetic tape, and the access latency of cold data ranges from 3/8 to 4/8 the length of the magnetic tape.

In one embodiment, the idle location of the magnetic tape is a reserved area where data is not recorded, for example, a lateral band extending across the width of the magnetic tape. In this embodiment, stopping the magnetic tape over a reserved area will not adversely affect previously recorded data, or the recording integrity of the tape due to excessive wear or contaminants that may build up at the idle location. In one embodiment, the area of the magnetic tape reserved as the idle location (e.g., lateral band) may be sufficiently wide and/or sufficiently long to enable the control circuitry 6 to dither the idle location in order to spread out the adverse effect of tape wear or contaminant build up.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device configured to access a magnetic tape, the data storage device comprising:
   at least one head configured to access the magnetic tape; and
   control circuitry configured to position the head at an idle location along a length of the magnetic tape when entering an idle mode, wherein:
      the idle location is in a first area of high access frequency data recorded on the magnetic tape such that a second area of low access frequency data is outwardly of the first area relative to the idle location,
      the high access frequency data is data having an access frequency that exceeds a threshold, and
      the low access frequency data is data having an access frequency below the threshold.

2. The data storage device as recited in claim 1, wherein the data storage device comprises the magnetic tape.

3. The data storage device as recited in claim 1, wherein:
   the magnetic tape is housed into a cartridge assembly; and
   the data storage device comprises a tape drive assembly configured to receive the cartridge assembly.

4. The data storage device as recited in claim 1, wherein the idle location is proximate a middle of the length of the magnetic tape.

5. The data storage device as recited in claim 1, wherein the control circuitry is further configured to detect the high access frequency data.

6. The data storage device as recited in claim 1, wherein the control circuitry is further configured to receive a configuration command from a host identifying the idle location.

7. The data storage device as recited in claim 1, wherein the control circuitry is further configured to:
   write high access frequency data proximate the idle location of the magnetic tape; and
   write low access frequency data away from the idle location of the magnetic tape.

8. The data storage device as recited in claim 7, wherein the control circuitry is further configured to write high access frequency data from the idle location of the magnetic tape toward an end of the magnetic tape.

9. The data storage device as recited in claim 7, wherein the control circuitry is further configured to write low access frequency data proximate an end of the magnetic tape.

10. The data storage device as recited in claim 9, wherein the control circuitry is further configured to write the low access frequency data toward the idle location.

11. A data storage device configured to access a magnetic tape, the data storage device comprising:
   at least one head configured to access the magnetic tape; and
   control circuitry configured to position the head at an idle location along a length of the magnetic tape when entering an idle mode, wherein:
      the idle location reduces a wake latency associated with accessing the magnetic tape when exiting the idle mode,
      the idle location is in a first area of high access frequency data recorded on the magnetic tape such that a second area of low access frequency data is outwardly of the first area relative to the idle location,
      the high access frequency data is data having an access frequency that exceeds a threshold, and
      the low access frequency data is data having an access frequency below the threshold.

12. The data storage device as recited in claim 11, wherein the data storage device comprises the magnetic tape.

13. The data storage device as recited in claim 11, wherein:
   the magnetic tape is housed into a cartridge assembly; and
   the data storage device comprises a tape drive assembly configured to receive the cartridge assembly.

14. The data storage device as recited in claim 11, wherein the idle location is proximate a middle of the length of the magnetic tape.

15. The data storage device as recited in claim 11, wherein the control circuitry is further configured to detect the high access frequency data.

16. The data storage device as recited in claim 11, wherein the control circuitry is further configured to receive a configuration command from a host identifying the idle location.

17. The data storage device as recited in claim 11, wherein the control circuitry is further configured to:
   write high access frequency data proximate the idle location of the magnetic tape; and
   write low access frequency data away from the idle location of the magnetic tape.

18. The data storage device as recited in claim 17, wherein the control circuitry is further configured to write high access frequency data from the idle location of the magnetic tape toward an end of the magnetic tape.

19. The data storage device as recited in claim 17, wherein the control circuitry is further configured to write low access frequency data proximate an end of the magnetic tape.

20. The data storage device as recited in claim 19, wherein the control circuitry is further configured to write the low access frequency data toward the idle location.

21. A data storage device configured to access a magnetic tape, the data storage device comprising:
   at least one head configured to access the magnetic tape; and
   a means for positioning the head at an idle location along a length of the magnetic tape when entering an idle mode, wherein:
      the idle location reduces a wake latency associated with accessing the magnetic tape when exiting the idle mode,
      the idle location is in a first area of high access frequency data recorded on the magnetic tape such that a second area of low access frequency data is outwardly of the first area relative to the idle location,
      the high access frequency data is data having an access frequency that exceeds a threshold, and
      the low access frequency data is data having an access frequency below the threshold.

22. The data storage device as recited in claim 21, wherein the idle location is proximate a middle of the length of the magnetic tape.

* * * * *